(12) United States Patent (10) Patent No.: US 12,687,609 B2
Ohnishi et al. (45) Date of Patent: Jul. 21, 2026

(54) RADAR DEVICE AND GAIN ADJUSTMENT METHOD

(71) Applicant: Furuno Electric Co., Ltd., Nishinomiya-City (JP)

(72) Inventors: Yoshifumi Ohnishi, Nishinomiya-City (JP); Koki Yamaguchi, Nishinomiya (JP); Takuya Okimoto, Kakogawa (JP)

(73) Assignee: FURUNO ELECTRIC CO., LTD., Nishinomiya-City (JP)

( * ) Notice: Subject to any disclaimer, the term of this patent is extended or adjusted under 35 U.S.C. 154(b) by 250 days.

(21) Appl. No.: 18/592,635

(22) Filed: Mar. 1, 2024

(65) Prior Publication Data

US 2024/0201325 A1     Jun. 20, 2024

Related U.S. Application Data

(63) Continuation of application No. PCT/JP2022/012633, filed on Mar. 18, 2022.

(30) Foreign Application Priority Data

Aug. 23, 2021     (JP) ................................. 2021-135427

(51) Int. Cl.
G01S 7/35 (2006.01)

(52) U.S. Cl.
CPC .................................... G01S 7/358 (2021.05)

(58) Field of Classification Search
CPC ........ G01S 7/358; G01S 7/4021; G01S 7/038; G01S 13/937; G01S 7/352; G01S 7/354
See application file for complete search history.

(56) References Cited

U.S. PATENT DOCUMENTS 4,680,588 A * 7/1987 Cantwell ................. G01S 13/95
342/92
5,315,303 A 5/1994 Tsou et al.
(Continued)

FOREIGN PATENT DOCUMENTS

JP     H08-32383 A     2/1996
JP     H08-316997 A     11/1996
(Continued)

OTHER PUBLICATIONS

International Search Report and Written Opinion mailed on Apr. 26, 2022, received for PCT Application PCT/JP2022/012633, filed on Mar. 18, 2022, 13 pages including English Translation.

*Primary Examiner* — William Kelleher
*Assistant Examiner* — Ismaaeel A. Siddiquee
(74) *Attorney, Agent, or Firm* — XSENSUS LLP

(57)     ABSTRACT

A radar apparatus is provided with: a transmitter for transmitting a transmission signal in which the frequency is changed over time; a receiver for receiving a radio wave returned by the transmission signal being reflected by an object as a reception signal; a frequency convertor for generating an in-phase signal and a quadrature signal based on the reception signal; an amplitude signal generator for generating an in-phase amplitude signal indicating the amplitude of the in-phase signal and a quadrature amplitude signal indicating the amplitude of the quadrature signal; a maximum value selector for selecting the higher level of the in-phase amplitude signal and the quadrature amplitude signal as the maximum value signal; and a gain adjuster for adjusting the gain of the reception signal based on the maximum value signal.

13 Claims, 11 Drawing Sheets

100

(56) References Cited

U.S. PATENT DOCUMENTS

| | | | |
|---|---|---|---|
| 9,831,836 B1 | 11/2017 | de Ruijter | |
| 2007/0216567 A1 | 9/2007 | Ikeda | |
| 2012/0071127 A1 | 3/2012 | Tsukamoto et al. | |
| 2013/0120185 A1 | 5/2013 | Kishigami et al. | |
| 2014/0266866 A1* | 9/2014 | Swirhun | G01S 7/026 |
| | | | 342/188 |
| 2019/0170857 A1 | 6/2019 | Nakajima et al. | |
| 2022/0268914 A1* | 8/2022 | Tzadok | G01S 7/354 |
| 2022/0302909 A1* | 9/2022 | Choi | H03F 3/04 |

FOREIGN PATENT DOCUMENTS

| | | | |
|---|---|---|---|
| JP | 2001-228240 A | | 8/2001 |
| JP | 2007-155728 A | | 6/2007 |
| JP | 2007-170819 A | | 7/2007 |
| JP | 2012-032229 A | | 2/2012 |
| JP | 2018-025475 A | | 2/2018 |
| JP | 2019071270 A | * | 5/2019 |
| JP | 2021-092585 A | | 6/2021 |
| KR | 2015-0102854 A | | 9/2015 |

* cited by examiner

Voltage

Time

RADAR DEVICE AND GAIN ADJUSTMENT METHOD

CROSS-REFERENCE TO RELATED APPLICATIONS

This application is a continuation application of PCT International Application No. PCT/JP2022/012633, which was filed on Mar. 18, 2022, and which claims priority to Japanese Patent Application No. JP2021-135427 filed on Aug. 23, 2021, the entire disclosures of each of which are herein incorporated by reference for all purposes.

TECHNICAL FIELD

The present invention relates to a radar apparatus (device) and gain adjustment method.

BACKGROUND

Conventionally, a technique for adjusting the gain of a received signal in a FM-CW (Frequency Modulated Continuous Wave) radar apparatus has been known. For example, Patent Document 1 (Japanese Patent Application Laid-Open No. 2001-228240) discloses a received signal amplifier as follows. That is, in the received signal amplifier of an FM-CW radar which transmits radio waves and receives reflected waves from a target to obtain a distance to the target or a relative speed to the target, the received signal amplifier includes a plurality of amplifiers connected in tandem to amplify a received signal, and an output selection means which selects an amplifier whose output voltage matches the input voltage range of the A/D convertor and whose level is the highest among the amplifiers and guides the output to the A/D convertor.

SUMMARY

In the technique described in Patent Document 1, the gain of the received signal is adjusted by selectively using one or more amplifiers from among a plurality of amplifiers, and it is difficult to finely adjust the gain of the received signal. In addition, in the technique described in Patent Document 1 as the prior art, in which the gain of the received signal is controlled by using an AGC (Auto Gain Control) circuit, the gain of the received signal may not be adjusted appropriately. If the gain of the received signal cannot be adjusted appropriately, for example, the strength of the received signal after adjustment of the gain may be excessively large. Beyond such conventional techniques, it is desirable to have a technique capable of more appropriately adjusting the gain of the received signal.

The present invention has been made to solve the above-mentioned problems, and its objective is to provide a radar apparatus and a gain adjusting method capable of more appropriately adjusting the gain of the received signal.

(1) In order to solve the above problem, a radar apparatus according to an aspect of the present invention is provided with: a transmitter for transmitting a transmission signal in which the frequency is changed over time; a receiver for receiving a radio wave returned by the transmission signal reflected by an object as a reception signal; a frequency convertor for generating in-phase and quadrature signals based on the reception signal; an amplitude signal generator for generating an in-phase amplitude signal indicating the amplitude of the in-phase signal and a quadrature amplitude signal indicating the amplitude of the quadrature signal; a maximum value selector for selecting the higher level of the in-phase amplitude signal and the quadrature amplitude signal as the maximum value signal; and a gain adjuster for adjusting the gain of the reception signal based on the maximum value signal.

Thus, when the amplitude of the in-phase signal and the amplitude of the quadrature signal are different from each other due to the gain or the like of each signal path, the gain of the received signal can be adjusted based on the amplitude of the higher amplitude of the in-phase signal and the quadrature signal. Therefore, the gain of the received signal can be adjusted more appropriately. In addition, the gain of the received signal can be adjusted according to the magnitude of the amplitude of the in-phase signal and the quadrature signal in which the influence of the interference of the transmitted signal with the received signal is reduced. Further, the process of generating the in-phase amplitude signal and the quadrature amplitude signal and selecting the maximum value signal can be realized by a simple circuit configuration consisting of general-purpose components such as an operational amplifier, a resistor, a capacitor and a diode.

(2) The radar apparatus may further be provided with a low-pass filter which receives the maximum value signal and attenuates a component of the maximum value signal which is equal to or greater than a predetermined frequency, and the gain adjuster may be configured to adjust the gain of the received signal based on the maximum value signal passed through the low-pass filter.

With such a configuration, for example, the gain of the received signal can be adjusted based on the smoothed maximum value signal with the ripple removed, so that the gain can be adjusted more accurately according to the level of the received signal.

(3) Some functionalities and/or a portion of the processing circuitry, such as the amplitude signal generator, the maximum value selector, the low-pass filter, and the gain adjuster may be configured by an analog circuit.

With such a configuration, it is possible to adjust the gain with higher responsiveness to fluctuations in the level of the received signal compared with a configuration in which the gain of the received signal is adjusted using a digital circuit.

(4) The frequency convertor may be configured to generate the in-phase signal and the quadrature signal of the baseband band, and the amplitude signal generator may be configured to generate the in-phase amplitude signal indicating the amplitude of the in-phase signal of the baseband band and the quadrature amplitude signal indicating the amplitude of the quadrature signal of the baseband band.

Thus, by the configuration in which the gain is adjusted using the in-phase signal and the quadrature signal of the baseband, the gain of the received signal can be adjusted according to the magnitude of the amplitudes of the in-phase signal and the quadrature signal in which the influence of the interference of the transmitted signal with the received signal is reduced, so that the occurrence of a malfunction of the gain control can be suppressed.

(5) The radar apparatus may further be configured to include an A/D convertor for digitally converting the in-phase signal and the quadrature signal, and a data convertor for converting the in-phase signal and the quadrature signal digitally converted by the A/D convertor into amplitude data indicating a relationship between distance and amplitude.

With such a configuration, the distance between the radar apparatus and the object can be detected in a wide dynamic range based on the transmitted signal and the received signal whose gain is adjusted.

(6) In addition, the gain adjustment method according to the embodiment of the present invention is a gain adjustment method in the radar apparatus, which transmits a transmitted signal whose frequency is changed over time, receives a radio wave returned by the transmitted signal reflected by the object as a received signal, generates an in-phase signal and a quadrature signal based on the received signal, generates an in-phase amplitude signal indicating the amplitude of the in-phase signal and a quadrature amplitude signal indicating the amplitude of the quadrature signal, selects the higher level of the in-phase amplitude signal and the quadrature amplitude signal as the maximum value signal, and adjusts the gain of the received signal based on the maximum value signal.

In this way, when the amplitude of the in-phase signal and the amplitude of the quadrature signal are different from each other due to the gain or the like of each signal path, the gain of the received signal can be adjusted based on the amplitude of the larger amplitude of the in-phase signal and the quadrature signal. Therefore, the gain of the received signal can be adjusted more appropriately. In addition, the gain of the received signal can be adjusted according to the magnitude of the amplitude of the in-phase signal and the quadrature signal in which the influence of the interference of the transmitted signal with the received signal is reduced. Further, the process of generating the in-phase amplitude signal and the quadrature amplitude signal to select the maximum value signal can be realized by a simple circuit configuration consisting of general-purpose components such as an operational amplifier, a resistor, a capacitor, and a diode.

BRIEF DESCRIPTION OF THE DRAWINGS

The following detailed description of illustrative embodiments is better understood when read in conjunction with the appended drawings. For the purpose of illustrating the present disclosure, exemplary constructions of the disclosure are shown in the drawings. However, the present disclosure is not limited to a specific device, or a tool and instrumentalities disclosed herein. Moreover, those skilled in the art will understand that the drawings are not to scale.

4

Figure 7:
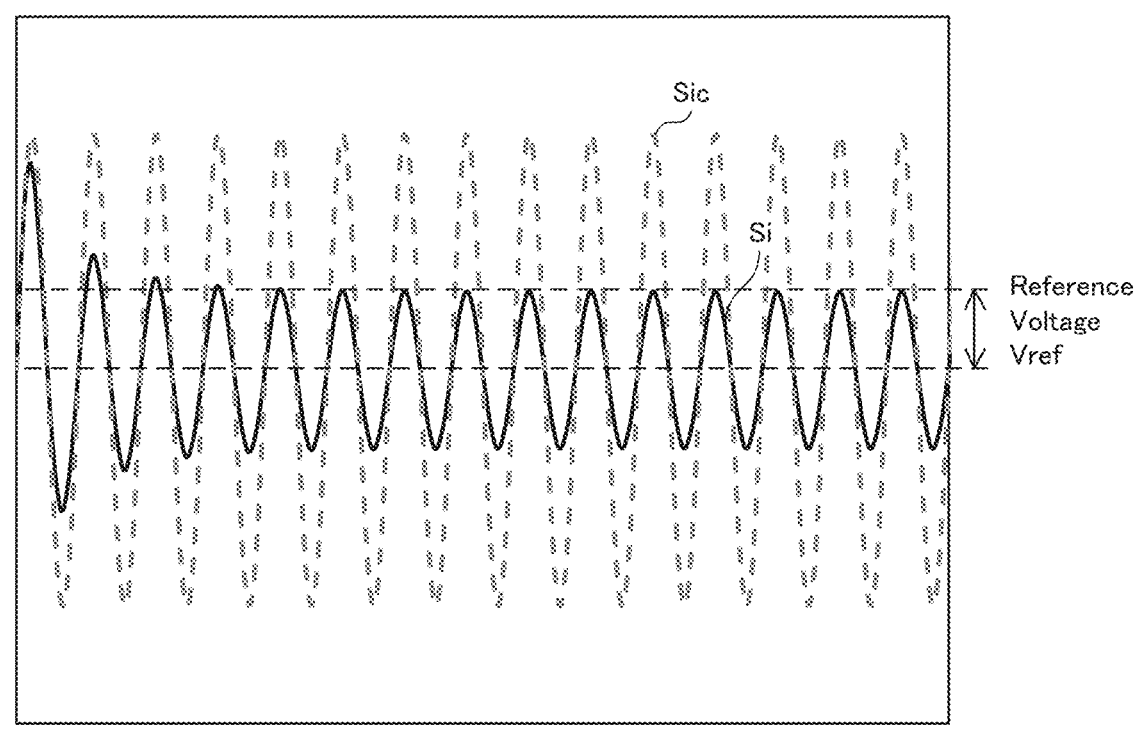

FIG. 7 is a diagram showing an example of a signal output by a frequency convertor in a radar apparatus according to an embodiment of the present invention.

Figure 8:
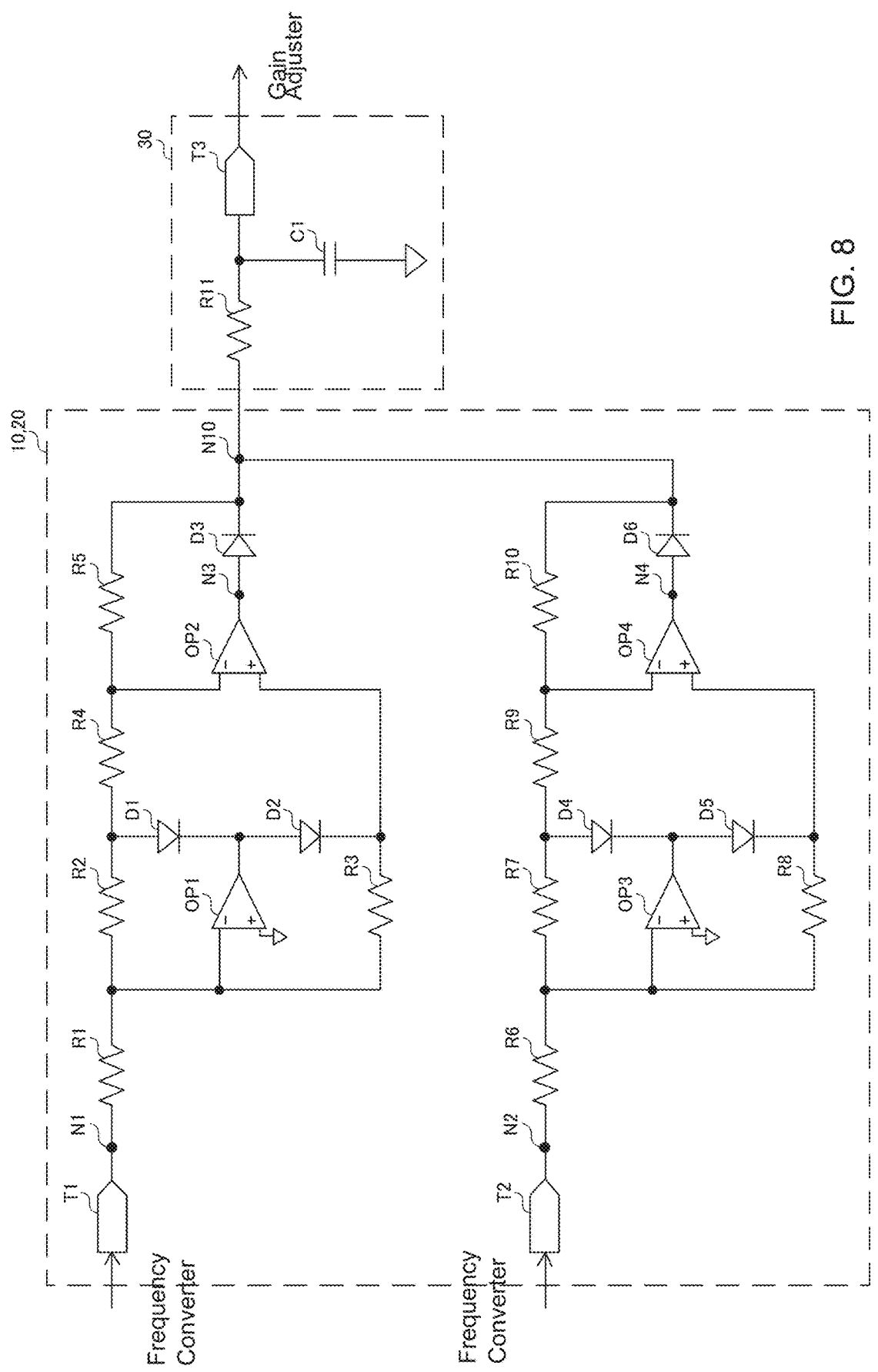

FIG. 8 is a diagram showing an example of a circuit configuration of an adjuster in a radar apparatus according to an embodiment of the present invention.

Figure 9:
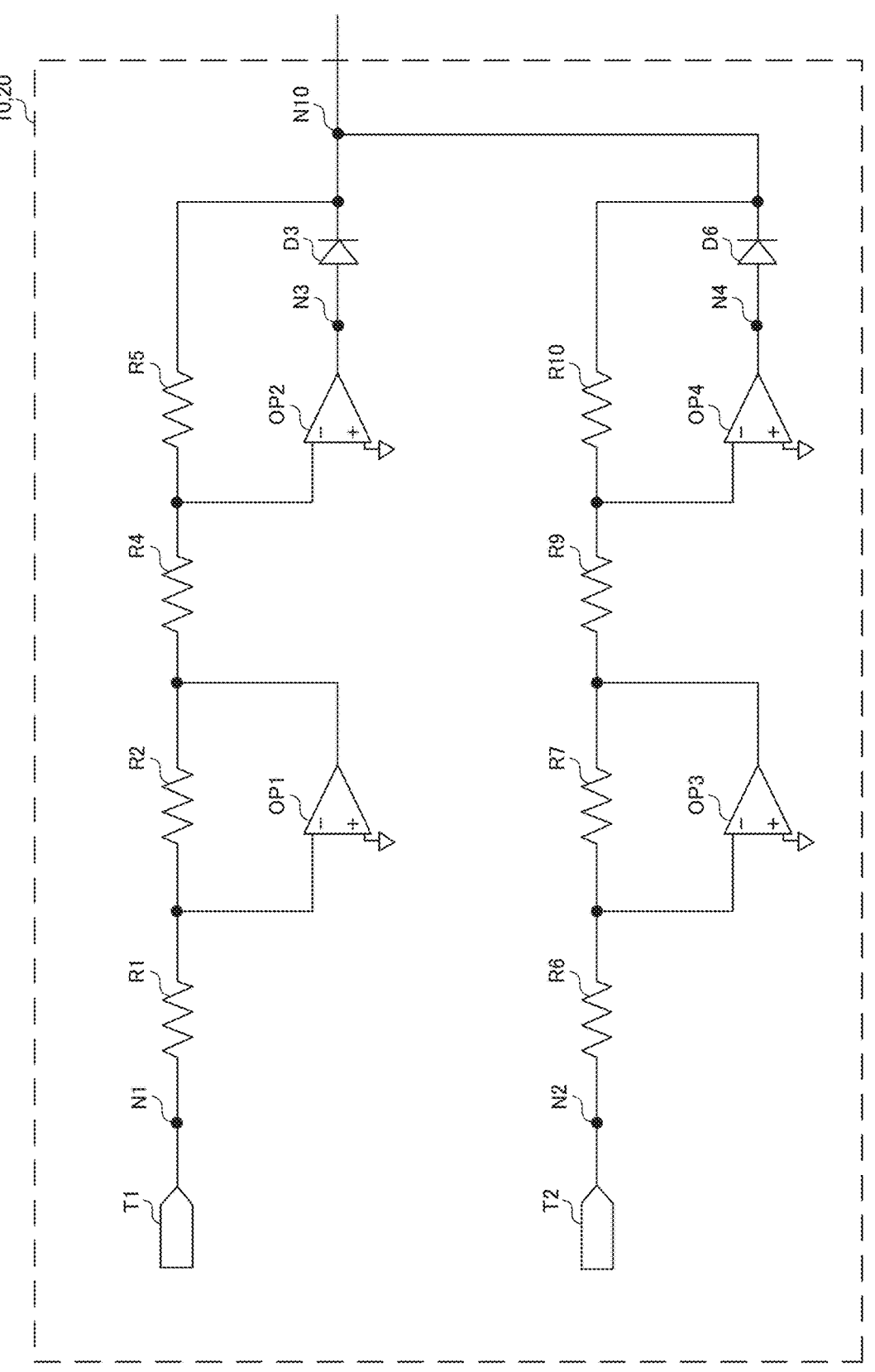

FIG. 9 is a diagram for explaining the operation of a circuit of an adjuster in a radar apparatus according to an embodiment of the present invention.

Figure 10:
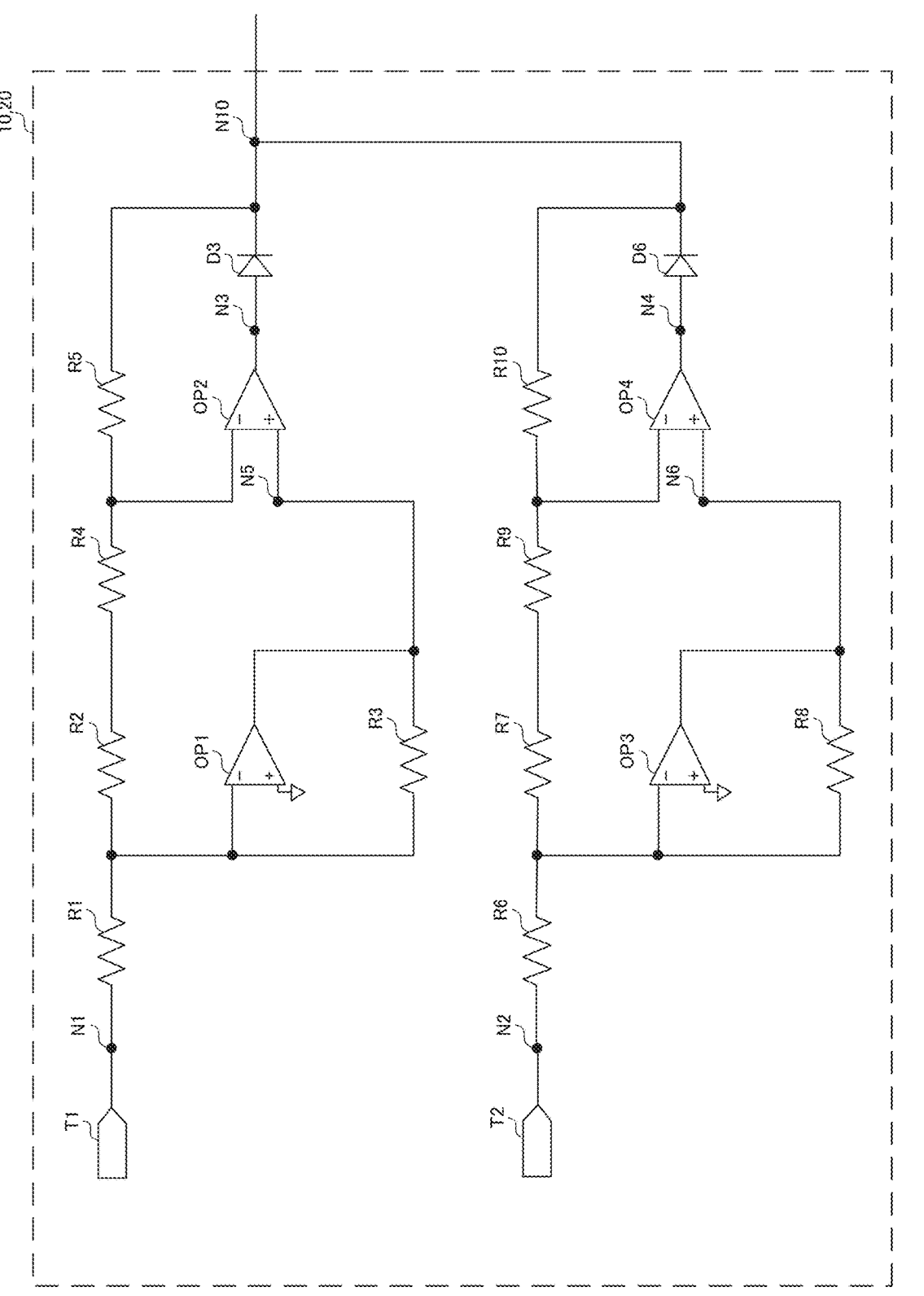

FIG. 10 is a diagram for explaining the operation of a circuit of an adjuster in a radar apparatus according to an embodiment of the present invention.

Figure 11:
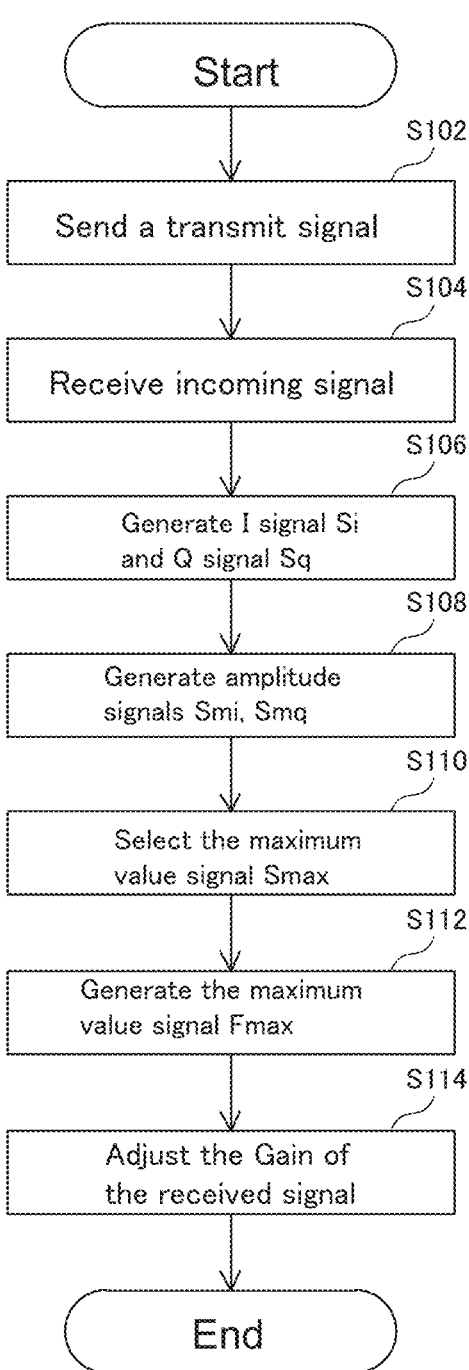

FIG. 11 is a flowchart showing an example of an operation procedure in which a radar apparatus according to an embodiment of the present invention adjusts the gain of a received signal.

DETAILED DESCRIPTION

Embodiments of the present invention will be described below with reference to the drawings. The same reference numerals are assigned to the same or corresponding portions in the figure, and the description is not repeated. At least a part of the embodiments described below may be optionally combined.

(Radar Apparatus)

Figure 1:
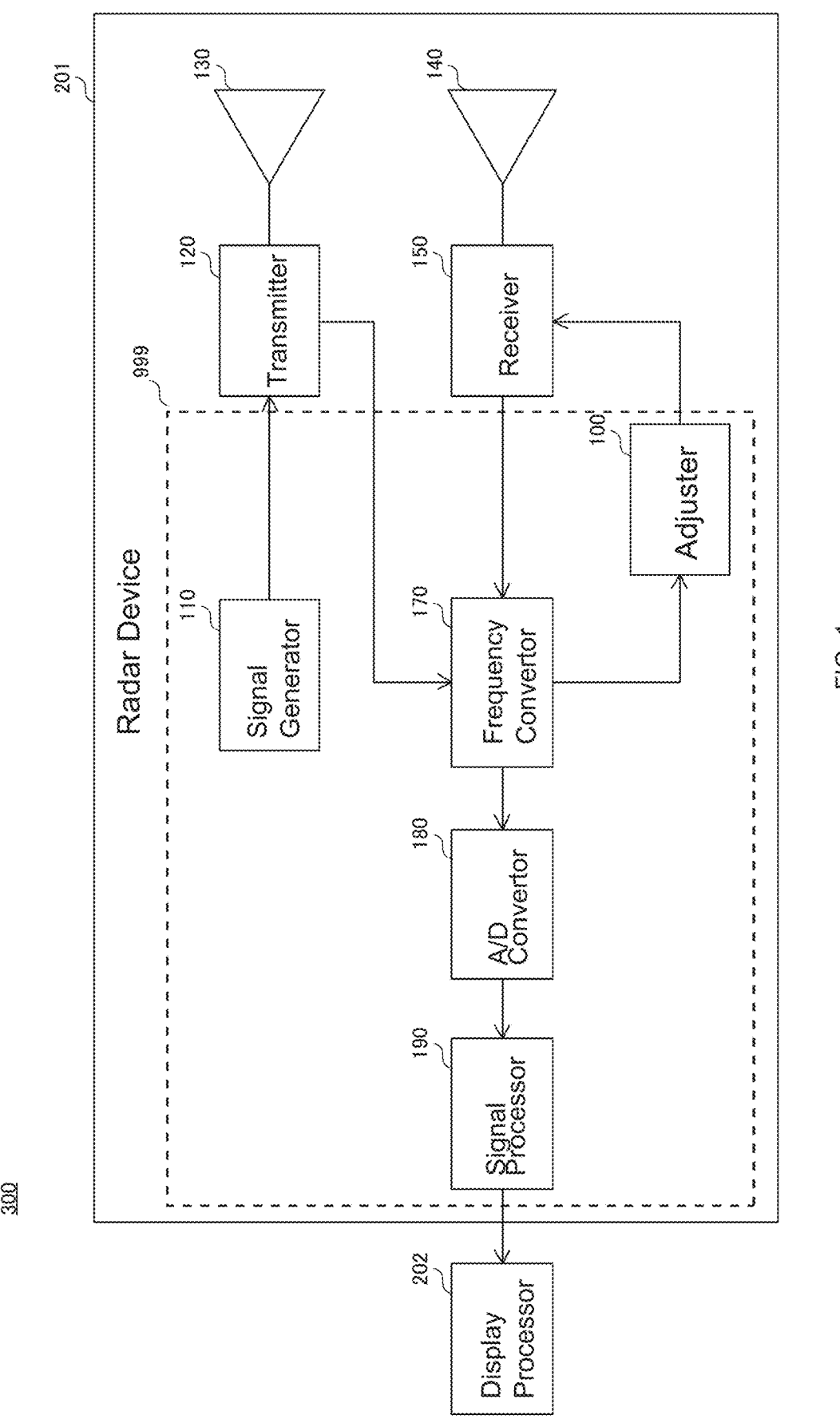
FIG. 1 is a diagram showing a configuration of a radar apparatus according to an embodiment of the present invention.

FIG. 1 is a diagram showing a configuration of a radar apparatus according to an embodiment of the present invention. Referring to FIG. 1, the radar apparatus 300 includes a radar device 201 and a display processor 202. The radar device 201 includes a signal generator 110, a transmitter 120, a transmission antenna 130, a reception antenna 140, a receiver 150, a frequency convertor 170, an A/D (Analog to Digital) convertor 180, a signal processor 190, and an adjuster 100. The signal processor 190 is an example of a data convertor. The radar apparatus 300 is an FM-CW type radar apparatus and is mounted on a ship, for example. The radar apparatus 300 performs processing to display on a display (not shown) an echo image indicating the presence or absence of a target in a detection target area which is a region monitored by a ship and the distance between the radar apparatus 300 and the target. The signal generator 110, the frequency convertor 170, the A/D (Analog to Digital) convertor 180, the signal processor 190, and the adjuster 100 can be implemented by "processing circuitry" 999.

The radar device 201 outputs echo data indicating the detection result of the target in a divided target area which is a region divided into a plurality of detection target areas to the display processor 202. The transmission antenna 130 and the reception antenna 140 rotate so that the azimuth angle in the radiation direction of the radio wave by the transmission antenna 130 changes by a predetermined angle every predetermined sweep period T. The radar device 201 outputs echo data in a plurality of divided target areas every sweep period T to the display processor 202.

Based on the plurality of echo data received from the radar device 201, the display processor 202 performs processing to display the echo image in the detected target area on the display.

(Radar Device)

The signal generator 110 repeatedly generates an analog signal of a predetermined pattern and outputs it to the transmitter 120. More specifically, during the sweep period T, the signal generator 110 outputs to the transmitter 120 an analog signal whose frequency increases by a predetermined amount per module time, for example, generated using an FM-CW modulation scheme. Specifically, for example, the signal generator 110 includes a voltage generator and a Voltage-Controlled Oscillator (VCO). The voltage generator generates an FM modulation voltage whose magnitude increases at a fixed rate during the sweep period T and outputs it to the VCO. The VCO generates an analog signal having a frequency corresponding to the magnitude of the FM modulation voltage received from the voltage generator and outputs it to the transmitter 120.

The transmitter 120 transmits a transmission signal whose frequency is changed over time. More specifically, the transmitter 120 generates a radio frequency (RF) band transmission signal based on the analog signal received from the signal generator 110 during the sweep period T, and outputs the generated RF band transmission signal to the area to be divided via a transmission antenna 130 that rotates with the rotation of the radar device 201. The transmitter 120 also outputs the generated RF band transmission signal to the frequency convertor 170. Specifically, for example, the transmitter 120 includes a frequency multiplier and a power amplifier. The frequency multiplier generates an RF band transmission signal based on the analog signal received from the signal generator 110, and outputs the generated transmission signal to the power amplifier and the frequency convertor 170. In the transmitter 120, the power amplifier amplifies the transmission signal received from the frequency multiplier and outputs the amplified transmission signal to the division target area via the transmission antenna 130.

The receiver 150 receives the radio wave returned from the transmission signal reflected by the object as a reception signal. More specifically, the receiver 150 receives the reflection signal of the RF band, in which the transmission signal transmitted from the transmission antenna 130 is the signal reflected by the object in the area to be divided, through the reception antenna 140 which rotates with the rotation of the radar device 201. For example, the receiver 150 amplifies the received signal of the RF band and outputs it to the frequency convertor 170. More specifically, the receiver 150 includes a variable gain amplifier. The variable gain amplifier amplifies the received signal received via the reception antenna 140 and outputs the amplified received signal to the frequency convertor 170. The variable gain amplifier changes the gain in accordance with the control voltage received from the adjuster 100.

The receiver 150 may be configured to attenuate the received RF band signal and output it to the frequency convertor 170. In this case, the receiver 150 includes a low noise amplifier and a variable gain attenuator instead of a variable gain amplifier. The low noise amplifier amplifies the received signal received via the reception antenna 140. The variable gain attenuator attenuates the received signal amplified by the low noise amplifier and outputs the attenuated received signal to the frequency convertor 170. The variable gain attenuator changes the gain or attenuation rate in accordance with the control voltage received from the adjuster 100.

The frequency convertor 170 generates the I signal S1 and the Q signal Sq based on the received signal received by the receiver 150. For example, the frequency convertor 170 generates the I signal S1 and the Q signal Sq in the baseband band. The I signal Si is an example of an in-phase signal. The Q signal Sq is an example of an orthogonal signal. The I signal S1 and the Q signal Sq are signals having a frequency component that is a difference between the frequency component of the transmission signal transmitted by the transmitter 120 and the frequency component of the reception signal received by the receiver 150. More specifically, the frequency convertor 170 includes two mixers. The demodulator (separator) (not shown) branches the transmission signal output from the transmitter 120, applies a phase difference of 90° to the branched transmission signal, and outputs it to each mixer in the frequency convertor 170. The demodulator (separator) (not shown) branches the reception signal output from the receiver 150 and outputs it to each mixer in the frequency convertor 170. The two mixers in the frequency convertor 170 multiply the transmission signal and the reception signal, respectively, to generate a baseband beat signal Sbb consisting of a set of I signal Si and Q signal Sq and output it to the adjuster 100 and the A/D convertor 180. For example, the frequency convertor 170 outputs to the adjuster 100 and the A/D convertor 180 a beat signal Sbb in which the low-frequency component and the DC component are removed by a capacitor.

The adjuster 100 performs AGC of the variable gain amplifier in the receiver 150 based on the beat signal Sbb received from the frequency convertor 170. For example, the adjuster 100 performs IAGC (Instant Auto Gain Control) of the variable gain amplifier. More specifically, the adjuster 100 generates a control voltage based on the beat signal Sbb received from the frequency convertor 170 and feeds the generated control voltage back to the variable gain amplifier to adjust the gain of the received signal. Details of the adjuster 100 will be described later.

An A/D convertor 180 digitally converts the I signal S1 and the Q signal Sq. That is, the A/D convertor 180 converts the analog beat signal Sbb received from the frequency convertor 170 into a beat signal SD which is a digital signal consisting of a set of the I signal S1 and the Q signal Sq. More specifically, the A/D convertor 180 generates N beat signals SD consisting of a set of N I signals S1 and N Q signals Sq by sampling at a predetermined sampling frequency every sweep period T, and outputs them to the signal processor 190. N is an integer of 2 or more.

The signal processor 190 converts the I signal S1 and the Q signal Sq digitally converted by the A/D convertor 180 into amplitude data DS indicating the relationship between the distance d and the amplitude. That is, the signal processor 190 converts the beat signal SD received from the A/D convertor 180 into amplitude data DS indicating the relationship between the distance d from the radar apparatus 300 and the amplitude. More specifically, the signal processor 190 receives N beat signals SD consisting of N sets of I signals S1 and N sets of Q signals Sq from the A/D convertor 180 for each sweep period T, and calculates the sum of the square of the I signals S1 and the square of the Q signals Sq for each set to convert the beat signal SD from a complex voltage to a real signal voltage. The signal processor 190 then performs processing such as window function processing and FFT processing on the beat signal SD converted to a real signal voltage to generate a power spectrum. The signal processor 190 multiplies the frequency in the generated power spectrum by a predetermined coefficient C to convert the frequency into a distance, thereby generating amplitude data DS. The signal processor 190 generates echo data by logarithmically converting the absolute value of the generated amplitude data DS, and outputs the generated echo data to the display processor 202.

Note that the radar apparatus 300 may have one antenna functioning as a transmission antenna 130 and a reception antenna 140 as an antenna for transmitting and receiving radio waves instead of a transmission antenna 130 and a reception antenna 140. In this case, for example, the transmitter 120 transmits a transmission signal to the division target area via the circulator and the antenna. Also, for example, the receiver 150 receives a reception signal via the antenna and the circulator.

(Display Processor)

The display processor 202 generates integrated data which is echo data in the detection target area based on echo data for each division target area received from the signal processor 190, and performs processing to display the echo image in the detection target area on a display (not shown) based on the generated integrated data.

(Adjuster)

Figure 2:
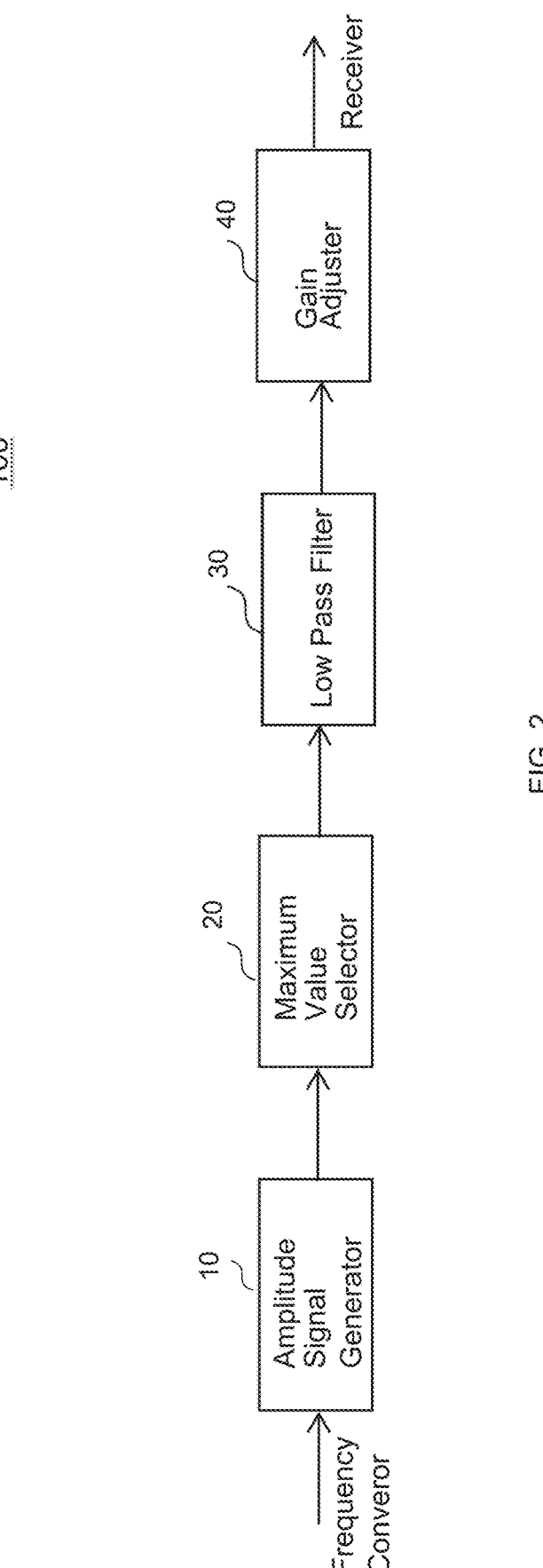
FIG. 2 is a diagram showing a configuration of an adjuster in a radar apparatus according to an embodiment of the present invention.

FIG. 2 is a diagram showing a configuration of an adjuster in a radar apparatus according to an embodiment of the present invention. Referring to FIG. 2, the adjuster 100 includes an amplitude signal generator 10, a maximum value selector 20, a low-pass filter (LPF) 30, and a gain adjuster 40.

(Amplitude Signal Generator)

The amplitude signal generator 10 generates an amplitude signal Smi indicating the amplitude of the I signal S1 and an amplitude signal Smq indicating the amplitude of the Q signal Sq. For example, the amplitude signal generator 10 generates an amplitude signal Smi indicating the amplitude of the I signal Si in the baseband band and an amplitude signal Smq indicating the amplitude of the Q signal Sq in the baseband band. The amplitude signal Smi is an example of an in-phase amplitude signal. The amplitude signal Smq is an example of a quadrature amplitude signal.

Figure 3:
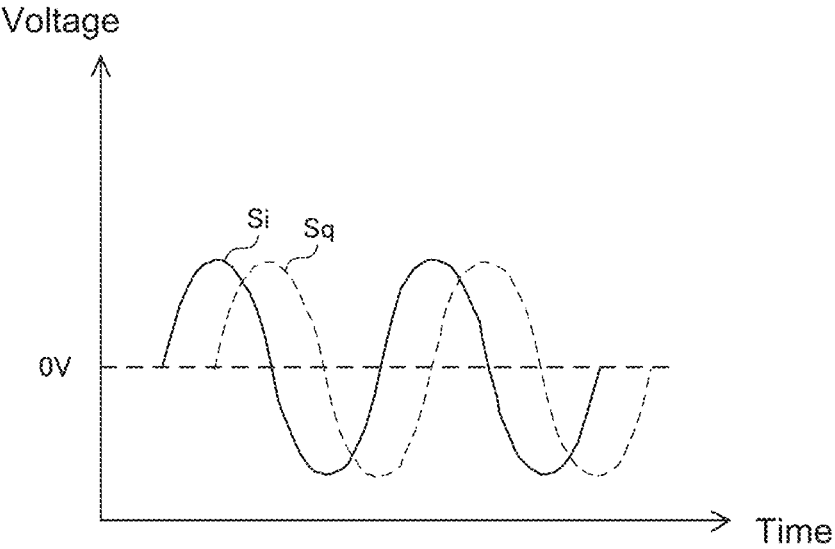
FIG. 3 is a diagram showing an example of a signal received by an amplitude signal generator in a radar apparatus according to an embodiment of the present invention.

FIG. 3 is a diagram showing an example of a signal received by an amplitude signal generator in a radar apparatus according to an embodiment of the present invention. In FIG. 3, a solid line indicates an I signal Si, and a dashed line indicates a Q signal Sq.

Figure 4:
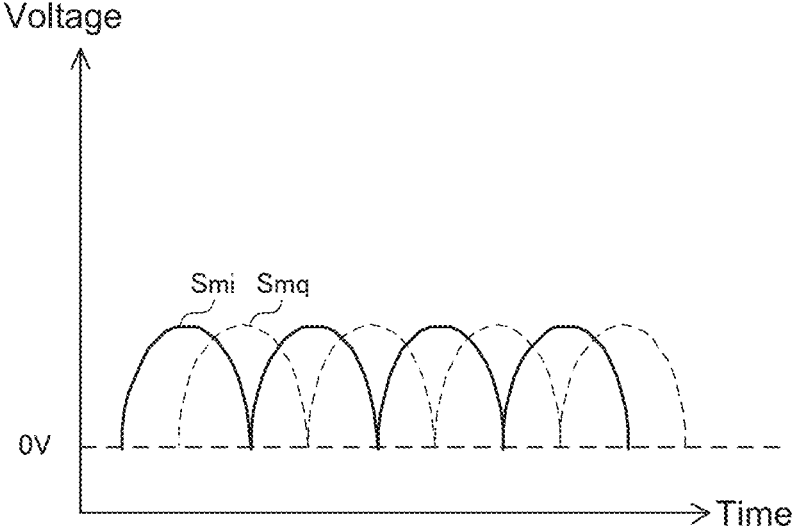
FIG. 4 is a diagram showing an example of a signal output by an amplitude signal generator in a radar apparatus according to an embodiment of the present invention.

FIG. 4 is a diagram showing an example of a signal output by an amplitude signal generator in a radar apparatus according to an embodiment of the present invention. In FIG. 4, a solid line indicates an amplitude signal Smi, and a dashed line indicates an amplitude signal Smq.

Referring to FIGS. 3 and 4, for example, the amplitude signal generator 10 receives the baseband I signal S1 and Q signal Sq output from the frequency convertor 170, and outputs an amplitude signal Smi indicating the absolute value of the level of the received I signal S1 and an amplitude signal Smq indicating the absolute value of the level of the received Q signal Sq to the maximum value selector 20.

More specifically, the amplitude signal generator 10 outputs an amplitude signal Smi that is a full-wave rectified waveform of the I signal S1 and an amplitude signal Smq that is a full-wave rectified waveform of the Q signal Sq to the maximum value selector 20.

The radar device 201 may have an offset applying circuit (not shown). The offset applying circuit receives the I signal S1 and the Q signal Sq output from the frequency convertor 170, applies a predetermined level of offset voltage Vo to the received I signal S1 and the Q signal Sq, and outputs the offset voltage Vo to the adjuster 100 and the A/D convertor 180. Thus, for example, a unipolar A/D convertor can be used as the A/D convertor 180.

In this case, the amplitude signal generator 10 receives the I signal Si and the Q signal Sq of the baseband band output from the offset applying circuit, and outputs the amplitude signal Smi indicating the absolute value of the level of the received I signal S1 and the amplitude signal Smq indicating the absolute value of the level of the received Q signal Sq to the maximum value selector 20.

(Maximum Value Selector)

The maximum value selector 20 selects the higher level of the amplitude signal Smi and the amplitude signal Smq as the maximum value signal Smax.

Figure 5:
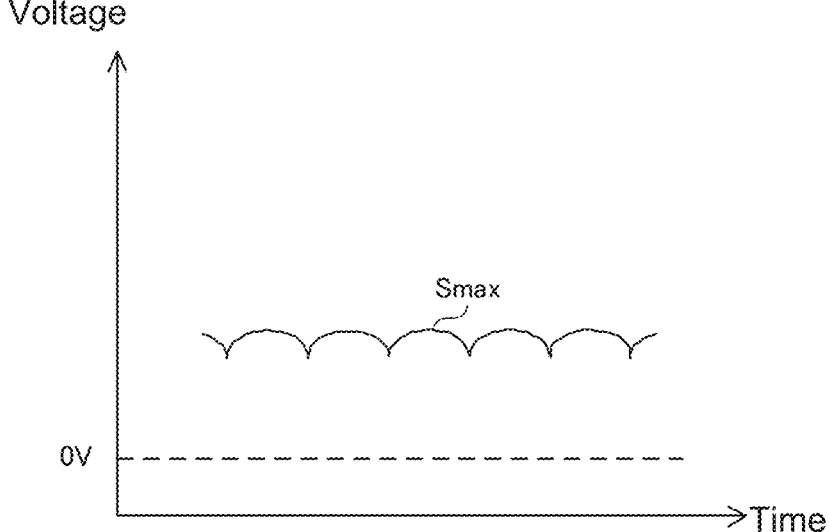
FIG. 5 is a diagram showing an example of a maximum value signal output by a maximum value selector in a radar apparatus according to an embodiment of the present invention.

FIG. 5 is a diagram showing an example of the maximum value signal output by the maximum value selector in the radar apparatus according to the embodiment of the present invention.

Referring to FIG. 5, the maximum value selector 20 outputs the maximum value signal Smax obtained by taking the maximum value of the amplitude signals Smi and Smq received from the amplitude signal generator 10 to the LPF 30.

(LPF)

The LPF 30 receives the maximum value signal Smax and attenuates the components of the maximum value signal Smax that are equal to or greater than a predetermined frequency.

Figure 6:
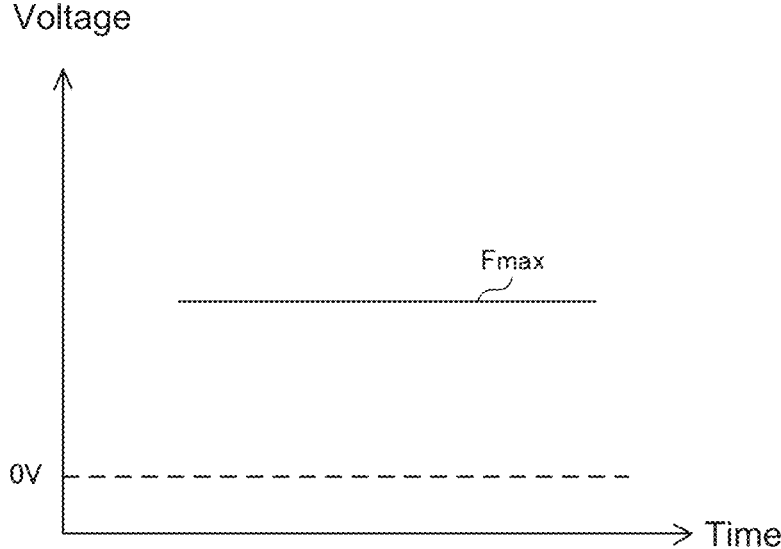
FIG. 6 is a diagram showing an example of a maximum value signal output by an LPF (Low Pass Filter) in a radar apparatus according to an embodiment of the present invention.

FIG. 6 is a diagram showing an example of a maximum value signal output by the LPF in a radar apparatus according to an embodiment of the present invention.

Referring to FIG. 6, the LPF 30 filters the maximum value signal Smax received from the maximum value selector 20, and outputs the maximum value signal Fmax, which is a signal smoothed by removing ripples, to the gain adjuster 40.

When the I signal S1 and the Q signal Sq received by the amplitude signal generator 10 from the frequency convertor 170 are sinusoidal, the level of the maximum signal Fmax output by the LPF 30 is close to the peak voltage of the sinusoidal wave. The level of the maximum signal Fmax is proportional to the level of the I signal Si and the Q signal Sq received by the amplitude signal generator 10 from the frequency convertor 170.

(Gain Adjuster)

The gain adjuster 40 adjusts the gain of the received signal based on the maximum value signal Smax. For example, the gain of the received signal is adjusted based on the maximum value signal Fmax passed through the LPF 30.

More specifically, the gain adjuster 40 generates a control voltage corresponding to the level of the maximum value signal Fmax received from the LPF 30, and outputs the generated control voltage to a variable gain amplifier in the receiver 150.

For example, the gain adjuster 40 includes an integrator using an operational amplifier. In the integrator, a maximum value signal Fmax is inputted to the non-inverting input terminal, a reference voltage Vref of a predetermined level is inputted to the inverting input terminal, and a control voltage is outputted from the output terminal. For example, the reference voltage Vref is preset based on the dynamic range of the A/D convertor 180.

FIG. 7 is a diagram showing an example of a signal output by the frequency convertor in a radar apparatus according to an embodiment of the present invention. In FIG. 7, a solid line indicates the I signal Si output from the frequency convertor 170 to the A/D convertor 180 in the radar apparatus 300, and a dashed line indicates the I signal Sic output from the frequency convertor 170 to the A/D convertor 180 in a radar apparatus without the adjuster 100.

Referring to FIG. 7, in a radar apparatus without the adjuster 100, a beat signal Sbb not conforming to the dynamic range of the A/D convertor 180 may be output from the frequency convertor 170 to the A/D convertor 180 due to an increase in the level of the received signal received via the reception antenna 140.

In contrast, in the radar apparatus 300, when the adjuster 100 performs IAGC, the level of the beat signal Sbb output from the frequency convertor 170 to the A/D convertor 180 converges to the level of the reference voltage Vref. Therefore, even when the level of the received signal increases, the level of the beat signal Sbb output from the frequency convertor 170 to the A/D convertor 180 can be adjusted so as to conform to the dynamic range of the A/D convertor 180.

(Circuit Configuration)

FIG. 8 is a diagram showing an example of a circuit configuration of an adjuster in a radar apparatus according to an embodiment of the present invention. FIG. 8 shows a circuit configuration of an amplitude signal generator 10, a maximum value selector 20, and an LPF 30.

Referring to FIG. 8, an amplitude signal generator 10, a maximum value selector 20, and an LPF 30 are configured by an analog circuit. More specifically, the amplitude signal generator 10 and the maximum value selector 20 have input terminals T1 and T2, resistors R1 to R10, diodes D1 to D6, and operational amplifiers OP1 to OP4. The LPF 30 has a resistor R11, a capacitor C1, and an output terminal T3. For example, the resistance values of the resistors R1 to R10 are the same as each other.

The input terminal T1 receives the I signal Si output from the frequency convertor 170. The input terminal T2 receives the Q signal Sq output from the frequency convertor 170. The output terminal T3 outputs the maximum value signal Fmax to the gain adjuster 40.

The input terminal T1 is connected to the first end of the resistor R1. The input terminal T2 is connected to the first end of the resistor R6.

The second end of the resistor R1, the first end of the resistor R2, the inverted input terminal of the operational amplifier OP1, and the first end of the resistor R3 are connected. The non-inverted input terminal of the operational amplifier OP1 and the ground are connected. The second end of the resistor R2, the first end of the resistor R4 and the anode of the diode D1 are connected. A cathode of the diode D1, an output terminal of the operational amplifier OP1, and an anode of the diode D2 are connected. A second end of the resistor R4, a first end of the resistor R5, and an inverted input terminal of the operational amplifier OP2 are connected. A second end of the resistor R3, a cathode of the diode D2, and a non-inverted input terminal of the operational amplifier OP2 are connected. An output terminal of the operational amplifier OP2 and an anode of the diode D3 are connected.

A second end of the resistor R6, a first end of the resistor R7, an inverted input terminal of the operational amplifier OP3, and a first end of the resistor R8 are connected. A non-inverted input terminal of the operational amplifier OP3 and a ground are connected. A second end of the resistor R7, a first end of the resistor R9 and an anode of the diode D4 are connected. A cathode of the diode D4, an output terminal of the operational amplifier OP3 and an anode of the diode D5 are connected. A second end of the resistor R9, a first end of the resistor R10 and an inverted input terminal of the operational amplifier OP4 are connected. The second end of the resistor R8, the cathode of the diode D5, and the non-inverting input terminal of the operational amplifier OP4 are connected. The output terminal of the operational amplifier OP4 and the anode of the diode D6 are connected.

The second end of the resistor R5, the cathode of the diode D3, the second end of the resistor R10, the cathode of the diode D6, and the first end of the resistor R11 are connected. The second end of the resistor R11, the first end of the capacitor C1, and the output terminal T3 are connected. The first end of the capacitor C1 and the ground are connected.

FIG. 9 is a diagram for explaining the operation of the circuit of the adjuster in the radar apparatus according to the embodiment of the present invention. FIG. 9 shows the operation of the circuit when the potential of the node N1 at the first end of the resistor R1 and the node N2 at the first end of the resistor R6 are positive in the amplitude signal generator 10 and the maximum value selector 20.

Referring again to FIG. 8, when the potential V1 of the node N1 at the first end of the resistor R1 and the potential V2 of the node N2 at the first end of the resistor R6 are positive, the diodes D1, D4 become conductive and the diodes D2, D5 become non-conductive. Therefore, when the V1, V2 are positive, the amplitude signal generator 10 and the maximum value selector 20 are represented by the equivalent circuit shown in FIG. 9.

In this case, the operational amplifiers OP1 to OP4 perform inversion amplification. Therefore, the potential V3 of the node N3 between the output terminal of the operational amplifier OP2 and the anode of the diode D3 is equal to V1. The potential V4 of the node N4 between the output terminal of the operational amplifier OP4 and the anode of the diode D4 is equal to V2.

FIG. 10 is a diagram for explaining the operation of the circuit of the adjuster in the radar apparatus according to the embodiment of the present invention. FIG. 10 shows the operation of the circuit when the potential of the node N1 at the first end of the resistor R1 and the node N2 at the first end of the resistor R6 is negative in the amplitude signal generator 10 and the maximum value selector 20.

Referring again to FIG. 8, when the potential V1 of the node N1 and the potential V2 of the node N2 are negative, the diodes D2 and D5 become conductive and the diodes D1 and D4 become non-conductive. Therefore, when the potentials V1 and V2 are negative, the amplitude signal generator 10 and the maximum value selector 20 are represented by the equivalent circuit shown in FIG. 10.

In this case, the potential V5 of the node N5 on the non-inverting input terminal side of the operational amplifier OP2 becomes $(-2/3) \times V1$ according to the virtual short condition of the operational amplifier OP1 and Kirchhoff's law. The potential V6 of the node N6 on the non-inverting input terminal side of the operational amplifier OP4 becomes $(-2/3) \times V2$ according to the virtual short condition of the operational amplifier OP3 and Kirchhoff's law. The operational amplifiers OP2 and OP4 perform non-inverting amplification. Therefore, the potential V3 of the node N3 is equal to $-V1$. The potential V4 of the node N4 is equal to $-V2$.

As described with reference to FIGS. 9 and 10, V3 and V4 are equal to V1 and V2 when V1 and V2 are positive, and equal to $-V1$ and $-V2$ when V1 and V2 are negative. That is, V3 and V4 are equal to the absolute values of V1 and V2, respectively.

When V3 is larger than V4, the diode D3 becomes conductive and the diode D6 becomes non-conductive. On the other hand, when V4 is larger than V3, the diode D6 becomes conductive and the diode D3 becomes non-conductive. Therefore, the potential V10 of the node N10 on the cathode side of the diode D3 and on the cathode side of the diode D6 is equal to the larger potential of V3 and V4.

Accordingly, the amplitude signal generator 10 and the maximum value selector 20 receive the I signal S1 and the Q signal Sq, and output the maximum value signal Smax obtained by taking the maximum value between the amplitude signal Smi, which is the full-wave rectification waveform of the received I signal Si, and the amplitude signal Smq, which is the full-wave rectification waveform of the received Q signal Sq, to the LPF 30 at the subsequent stage.

When the amplitude signal generator 10 receives the I signal S1 and the Q signal Sq to which the offset voltage Vo is applied by the offset application circuit described above, the offset voltage Vo is applied to the non-inverting input terminal of the operational amplifier OP1 and the non-inverting input terminal of the operational amplifier OP3.

(Flow of Operation)

FIG. 11 is a flowchart showing an example of an operation procedure in which a radar apparatus according to an embodiment of the present invention adjusts the gain of a received signal.

Referring to FIG. 11, the radar apparatus 300 first transmits a transmission signal whose frequency is changed over time (step S102).

Next, the radar apparatus 300 receives, as a reception signal, a radio wave returned from the transmission signal reflected by the object (step S104).

Next, the radar apparatus 300 generates I signals S1 and Q signals Sq in the baseband band based on the received reception signal (step S106).

Next, the radar apparatus 300 generates amplitude signals Smi indicating the amplitude of I signals Si in the baseband band and Smq indicating the amplitude of Q signals Sq in the baseband band (step S108).

Next, the radar apparatus 300 selects the higher level of the amplitude signal Smi and the amplitude signal Smq as the maximum value signal Smax (step S110).

Next, the radar apparatus 300 generates the maximum value signal Fmax by filtering the maximum value signal Smax (step S112).

Next, the radar apparatus 300 adjusts the gain of the received signal based on the maximum value signal Fmax. More specifically, the gain adjuster 40 in the radar apparatus 300 outputs a control voltage corresponding to the level of the maximum value signal Fmax to the variable gain amplifier in the receiver 150 (step S114).

By the way, with the technique described in Patent Document 1, it is difficult to finely adjust the gain of the received signal. In addition, with the technique for controlling the gain of the received signal using an AGC circuit described as the prior art in Patent Document 1, it may not be possible to properly adjust the gain of the received signal. It is desirable to have a technique capable of more appropriately adjusting the gain of the received signal beyond such prior art.

On the other hand, in the radar apparatus 300 according to the embodiment of the present invention, the transmitter 120 transmits a transmission signal whose frequency is changed with time. The receiver 150 receives, as a reception signal, a radio wave returned from a transmission signal reflected by an object. The frequency convertor 170 generates an I signal S1 and a Q signal Sq based on the reception signal. The amplitude signal generator 10 generates an amplitude signal Smi indicating the amplitude of the I signal S1 and an amplitude signal Smq indicating the amplitude of the Q signal Sq. The maximum value selector 20 selects the higher level of the amplitude signal Smi and the amplitude signal Smq as the maximum value signal Smax. The gain adjuster 40 adjusts the gain of the received signal based on the maximum value signal Smax.

Thus, when the amplitude of the I signal S1 and the amplitude of the Q signal Sq are different from each other due to the gain or the like of each signal path, the gain of the received signal can be adjusted based on the amplitude of the I signal Si and the amplitude of the Q signal Sq that are larger than the amplitude of the I signal Si and the amplitude of the Q signal Sq. Therefore, the gain of the received signal can be adjusted more appropriately. In addition, the gain of the received signal can be adjusted according to the magnitude of the amplitudes of the I signal S1 and the Q signal Sq in which the influence of interference of the transmitted signal to the received signal is reduced. Further, the process of generating the amplitude signal Smi and the amplitude signal Smq and selecting the maximum value signal Smax can be realized by a simple circuit configuration consisting of general-purpose components such as an operational amplifier, a resistor, a capacitor, and a diode.

The above embodiments should be considered to be illustrative and not restrictive in all respects. It is intended that the scope of the present invention be indicated by the claims rather than the above description and include all changes within the meaning and scope of the claims and equivalence.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated" and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A radar apparatus comprising:
   a transmitter configured to transmit a transmission signal having a frequency configured to change over time;
   a receiver configured to receive a radio wave reflected by an object as a reception signal; and
   processing circuitry configured to:
   generate, based on the reception signal, each of an in-phase amplitude signal and a quadrature amplitude signal,
   wherein the in-phase amplitude signal and the quadrature amplitude signal are offset in time; and
   generate a maximum value signal based on the in-phase amplitude signal and the quadrature amplitude signal
   wherein, during a duration of time, the maximum value signal comprises maximum values of each of the in-phase amplitude signal and the quadrature amplitude signal,
   wherein, at any moment in time during the duration, the maximum value signal comprises either:
   only one of the in-phase amplitude signal or the quadrature amplitude signal that has a largest maximum value, or
   either the in-phase amplitude signal or the quadrature amplitude signal when the respective maximum values are equal; and
   to adjust the gain of the received signal based on the maximum value signal.

2. The radar apparatus according to claim 1, further comprising:
   a low-pass filter configured to receive the maximum value signal and to output an attenuated maximum value signal, the attenuated maximum value signal having a constant frequency that is equal to or greater than a predetermined cut-off frequency of the low-pass filter, wherein the processing circuitry is further configured:

to adjust the gain of the received signal based on the attenuated component of the maximum value signal that is output from the low-pass filter.

3. The radar apparatus according to claim 2, wherein:

a portion of the processing circuitry comprises an analog circuit.

4. The radar apparatus according to claim 1, wherein the in-phase amplitude signal and the quadrature amplitude signal correspond to a baseband band.

5. The radar apparatus according to claim 1 wherein the processing circuitry is further configured:

to digitally convert the in-phase signal and the quadrature signal; and to convert the in-phase signal and the quadrature signal digitally converted by the A/D convertor into amplitude data indicating a relationship between distance and amplitude.

6. A gain adjustment method in a radar apparatus comprising:

transmitting a transmission signal having a frequency configured to change over time;

receiving a radio wave reflected by an object as a reception signal;

generating in-phase and quadrature signals based on the reception signal;

generating, based on the reception signal, each of an in-phase amplitude signal and a quadrature amplitude signal, wherein the in-phase amplitude signal and the quadrature amplitude signal are offset in time; and generating a maximum value signal based on the in-phase amplitude signal and the quadrature amplitude signal, wherein, during a duration of time, the maximum value signal comprises maximum values of each of the in-phase amplitude signal and the quadrature amplitude signal, wherein, at any moment in time during the duration, the maximum value signal comprises either:

only one of the in-phase amplitude signal or the quadrature amplitude signal that has a largest maximum value, or either the in-phase amplitude signal or the quadrature amplitude signal when the respective maximum values are equal; and adjusting the gain of the received signal based on the maximum value signal.

7. The gain adjustment method according to claim 6, further comprising:

performing a low-pass filtering process on the maximum value signal to generate an attenuated maximum value signal, the attenuated maximum value signal having a constant frequency that is equal to or greater than a predetermined cut-off frequency of the low-pass filter, wherein the adjusting the gain comprises adjusting the gain of the received signal based on the attenuated component of the maximum value signal.

8. A non-transitory computer readable medium having stored thereon computer-executable instructions which, when executed by a computer, cause the computer to:

transmit a transmission signal having a frequency configured to change over time;

receive a radio wave reflected by an object as a reception signal;

generate, based on the reception signal, each of an in-phase amplitude signal and a quadrature amplitude signal, wherein the in-phase amplitude signal and the quadrature amplitude signal are offset in time; and generate a maximum value signal based on the in-phase amplitude signal and the quadrature amplitude signal, wherein, during a duration of time, the maximum value signal comprises maximum values of each of the in-phase amplitude signal and the quadrature amplitude signal, wherein, at any moment in time during the duration, the maximum value signal comprises either:

only one of the in-phase amplitude signal or the quadrature amplitude signal that has a largest maximum value, or either the in-phase amplitude signal or the quadrature amplitude signal when the respective maximum values are equal; and adjust the gain of the received signal based on the maximum value signal.

9. The radar apparatus according to claim 2, wherein the in-phase amplitude signal and the quadrature amplitude signal correspond to a baseband band.

10. The radar apparatus according to claim 3, wherein the in-phase amplitude signal and the quadrature amplitude signal correspond to a baseband band.

11. The radar apparatus according to claim 2 wherein the processing circuitry is further configured:

to digitally convert the in-phase signal and the quadrature signal; and to convert the in-phase signal and the quadrature signal digitally converted by the A/D convertor into amplitude data indicating a relationship between distance and amplitude.

12. The radar apparatus according to claim 3 wherein the processing circuitry is further configured:

to digitally convert the in-phase signal and the quadrature signal; and to convert the in-phase signal and the quadrature signal digitally converted by the A/D convertor into amplitude data indicating a relationship between distance and amplitude.

13. The radar apparatus according to claim 4 wherein the processing circuitry is further configured:

to digitally convert the in-phase signal and the quadrature signal; and to convert the in-phase signal and the quadrature signal digitally converted by the A/D convertor into amplitude data indicating a relationship between distance and amplitude.

* * * * *